United States Patent
Campau

(10) Patent No.: US 9,217,458 B2
(45) Date of Patent: Dec. 22, 2015

(54) PREVAILING TORQUE LOCKNUT

(71) Applicant: LockOn LLC, Byron Center, MI (US)

(72) Inventor: Daniel N. Campau, Ada, MI (US)

(73) Assignee: LOCKON LLC, Byron Center, MI (US)

( * ) Notice: Subject to any disclaimer, the term of this patent is extended or adjusted under 35 U.S.C. 154(b) by 107 days.

(21) Appl. No.: 13/958,857

(22) Filed: Aug. 5, 2013

(65) Prior Publication Data

US 2015/0037117 A1    Feb. 5, 2015

(51) Int. Cl.
| F16B 39/14 | (2006.01) |
| F16B 39/20 | (2006.01) |
| F16B 39/26 | (2006.01) |

(52) U.S. Cl.
CPC ................. *F16B 39/26* (2013.01); *F16B 39/14* (2013.01); *F16B 39/20* (2013.01)

(58) Field of Classification Search
CPC .......... F16B 30/20; F16B 39/32; F16B 37/12; F16B 39/28
USPC .......................................... 411/250–252, 262
See application file for complete search history.

(56) References Cited

U.S. PATENT DOCUMENTS

| 152,249 A | 6/1874 | Penfield |
| 422,027 A | 2/1890 | Marshall |
| 637,360 A | 11/1899 | Stark |
| 900,589 A | 10/1908 | Ratcliffe |
| 960,349 A | 6/1910 | Lafleur |
| 988,911 A | 4/1911 | Terry |
| 1,017,845 A | 2/1912 | Brown |
| 1,081,965 A | 12/1913 | Kester |
| 1,172,722 A | 2/1916 | Millard |
| 1,179,446 A | 4/1916 | Mennie |
| 1,267,656 A | 5/1918 | Goserud |
| 1,440,324 A | 12/1922 | Whitaker |
| 1,550,282 A | 8/1925 | Rennerfelt |
| 1,630,958 A | 5/1927 | Mauch |
| 1,830,918 A | 11/1931 | Sundh |
| 1,830,919 A | 11/1931 | Sundh |
| 1,830,920 A | 11/1931 | Sundh |
| 1,909,400 A | 5/1933 | Hall |

(Continued)

FOREIGN PATENT DOCUMENTS

| AT | 375452 | 8/1984 |
| CH | 209896 | 5/1940 |

(Continued)

OTHER PUBLICATIONS

International Search Report and Written Opinion for International Application No. PCT/US2012/037183, mailed Aug. 6, 2012.

(Continued)

*Primary Examiner* — Flemming Saether
(74) *Attorney, Agent, or Firm* — Warner Norcross and Judd LLP

(57) ABSTRACT

A prevailing torque locknut having a nut body, a locking band, and a retainer. The nut body includes a threaded portion and an unthreaded counterbore. The locking includes a coil portion and first and second tangs extending tangentially from the coil portion. The locking band is located within the counterbore, and the first and second tangs engage the counterbore sidewall to prevent relative rotation of the locking band within the nut body. The retainer is swaged into the nut body to secure the locking band within the nut body.

15 Claims, 3 Drawing Sheets

(56) References Cited

U.S. PATENT DOCUMENTS

| | | | |
|---|---|---|---|
| 1,929,169 A | 10/1933 | Hall | |
| 2,233,889 A | 3/1941 | Hood | |
| 2,255,948 A | 9/1941 | Swanstrom | |
| 2,320,032 A | 5/1943 | Danforth | |
| 2,367,929 A | 1/1945 | Colman | |
| 2,432,805 A | 12/1947 | Robertson | |
| 2,562,621 A | 7/1951 | Larson | |
| 2,587,560 A | 2/1952 | Widmer | |
| 2,823,725 A | 2/1958 | Trinca | |
| 3,391,720 A | 7/1968 | Morse | |
| 3,565,149 A | 2/1971 | Wetzel | |
| 3,589,423 A | 6/1971 | Metz | |
| 3,701,372 A | 10/1972 | Breed | |
| 4,004,486 A * | 1/1977 | Schenk | 411/16 |
| 4,069,855 A | 1/1978 | Petroshanoff | |
| 4,334,438 A | 6/1982 | Mochida | |
| 4,357,726 A | 11/1982 | Trimmer | |
| 4,692,078 A | 9/1987 | Dessouroux | |
| 4,983,085 A | 1/1991 | Gray | |
| 5,449,259 A | 9/1995 | Clohessey | |
| 5,529,348 A | 6/1996 | Wasserman et al. | |
| 6,015,251 A | 1/2000 | Chung | |
| 8,016,532 B2 | 9/2011 | Park | |
| 8,021,093 B2 | 9/2011 | Campau | |
| 8,425,168 B2 | 4/2013 | Campau | |
| 8,439,616 B2 | 5/2013 | Campau | |
| 2009/0095359 A1 | 4/2009 | Campau | |
| 2009/0097940 A1 | 4/2009 | Campau | |
| 2010/0266364 A1 | 10/2010 | Campau | |
| 2012/0301246 A1 | 11/2012 | Campau | |

FOREIGN PATENT DOCUMENTS

| | | |
|---|---|---|
| EP | 1760334 | 3/2007 |
| FR | 1032330 | 7/1953 |
| FR | 1101421 | 10/1955 |
| FR | 1108071 | 1/1956 |
| FR | 1377030 | 10/1964 |
| FR | 2544030 | 10/1984 |
| GB | 04780 | 0/1909 |
| GB | 27703 | 0/1910 |
| GB | 221456 | 9/1924 |
| JP | 2003307210 | 10/2003 |
| WO | 2013112254 | 8/2013 |

OTHER PUBLICATIONS

International Search Report and Written Opinion for International Application No. PCT/US2011/049254, mailed Oct. 28, 2011.

PCT Notification of Transmittal of the International Search Report and Written Opinion of the International Searching Authority or the Declaration, International Search Report, Written Opinion of the International Searching Authority dated May 31, 2010 in PCT Application No. PCT/US2010/026196.

PCT Notification of Transmittal of the International Search Report and Written Opinion of the International Searching Authority or the Declaration, International Search Report, Written Opinion of the International Searching Authority dated Dec. 19, 2008 in PCT Application No. PCT/US2008/076155.

U.S. Appl. No. 12/880,580, filed Sep. 13, 2010, entitled "Locking Threaded Fastener".

United States Statutory Invention Registration No. H1588, published Sep. 3, 1996, entitled "Helical Spring Fastener".

International Search Report and Written Opinion for PCT/US2012/071114, dated Mar. 25, 2013.

International Search Report and Written Opinion from PCT/US2014/036476 dated Jul. 31, 2014.

* cited by examiner

PREVAILING TORQUE LOCKNUT

BACKGROUND OF THE INVENTION

The present invention relates to locknuts, and more particularly to locknuts including a spring coil or band.

All-metal prevailing torque locknuts are often specified for use in extreme temperature and/or high vibration applications. One of the more common types of locknuts has distorted threads to provide an interference fit with the mating male thread. A description of this type of locknut may be found at http://www.fastenermart.com/html/all-metal-locknuts.html. Locknuts with distorted threads have a very high prevailing torque which, in some cases, may be as high as the design torque of the bolted joint itself. This high prevailing torque makes installation of the locknut slow and difficult and control of joint clamp-up problematic. Further, if the joint consists of a number of all-metal locknuts, it is difficult to maintain uniform or desired clamp-up at all of the bolt locations. This can lead to structural weakness and to leaks in applications where fluid seals require uniform clamp-up to maintain proper gasket or joint compression.

Another common type of locknut is a split beam or flexloc locknut. A description of this type of locknut may be found at http://www.fastenermart.com/html/flexloc-nuts.html. This type of locknut has a nut body that includes a top portion with six narrow slots spaced 60° apart, thereby forming six flexing beams. These beams are bent inward slightly to provide a grip on the male threaded member. This type of locknut is relatively expensive compared to the distorted thread style locknut.

Both types of prevailing torque locknuts are only able to be used for a few on-off cycles. In the case of un-plated stainless steel locknuts, just one use is recommended. Consequently, the ability to reuse these locknuts is quite limited.

SUMMARY OF THE INVENTION

The noted problems with known locknuts are addressed by the present invention comprising a highly function, reusable, yet relatively inexpensive prevailing torque locknut.

The locknut of the present includes a nut body and a locking band. The nut body has a threaded portion and an unthreaded counterbore. The locking band includes a coil portion and first and second tangs that extend from the coil portion. The locking band is located within the counterbore. The first and second tangs extend tangentially from the coil portion and engage the counterbore, so that the first tang bears against the counterbore when the locknut is turned in a first direction, and the second tang bears against the counterbore when the locknut is turned in a second direction.

In the current embodiment, the counterbore includes a collar and a shoulder. The locking band is located below the shoulder, and the locknut includes a retainer on the shoulder to retain the locking band in position. The collar can be swaged to secure the retainer on the shoulder.

The present locknut provides improved performance compared to known prevailing torque locknuts. The locknut can be economically manufactured in materials suitable for extreme temperature service. Additionally, the locknut provides good vibration resistance, is reusable, and will not gall or seize. Further, the locknut provides consistent prevailing torque to improve joint clamp-up consistency.

These and other advantages and features of the invention will be more fully understood and appreciated by reference to the description of the current embodiments and the drawings.

DESCRIPTION OF THE CURRENT EMBODIMENT

Figure 1:
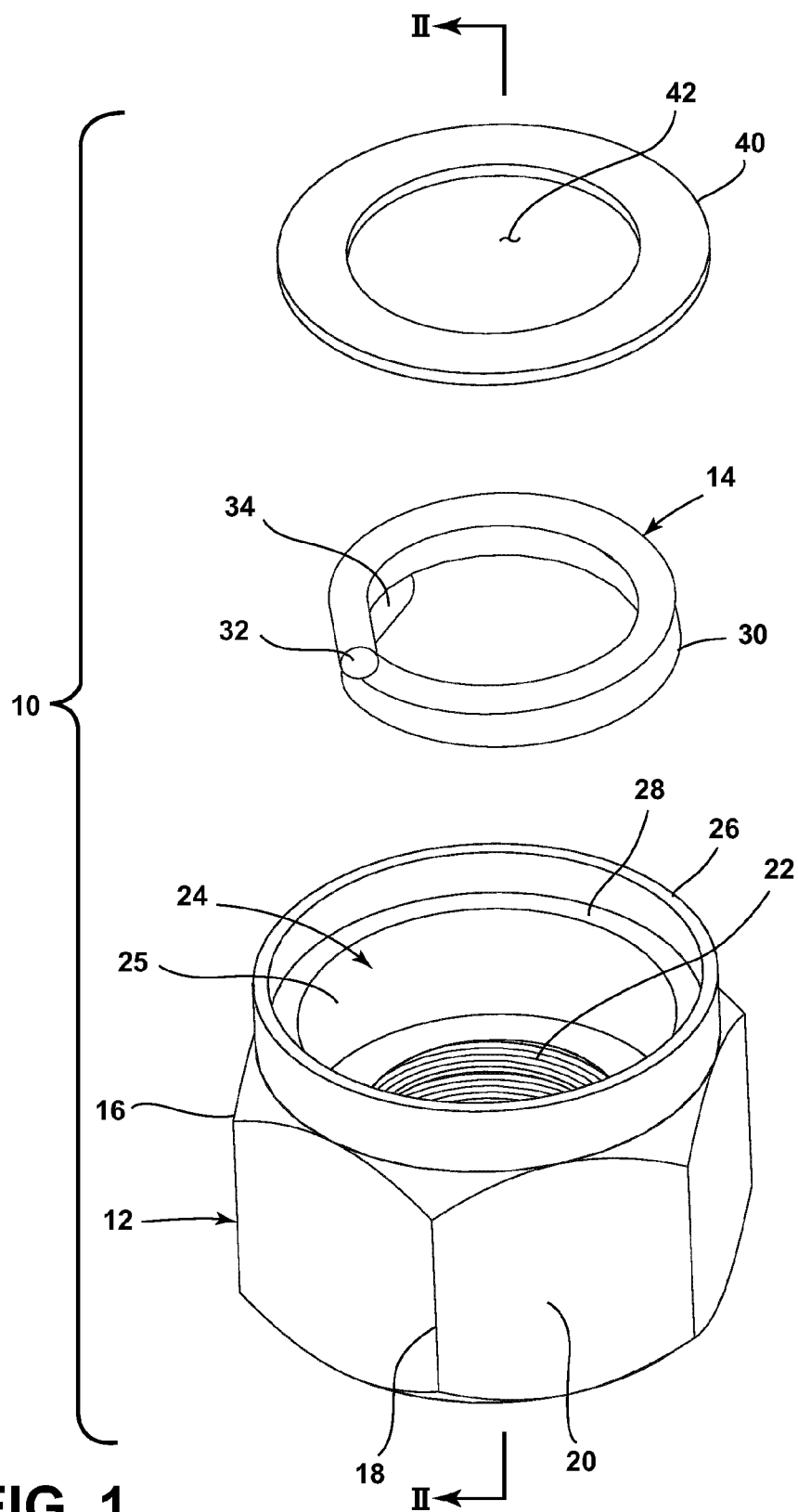
FIG. 1 is a perspective, exploded view of the current embodiment of the locknut.

Before the current embodiment of the invention is described, it is pointed out that the invention is not limited to the details of operation, the details of construction, or the arrangement of the components set forth in the following description or illustrated in the drawings. The invention may be implemented in various other embodiments and may be practiced or carried out in alternative ways not expressly disclosed herein. Also, it is pointed out that the terminology used herein is for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

Figure 2:
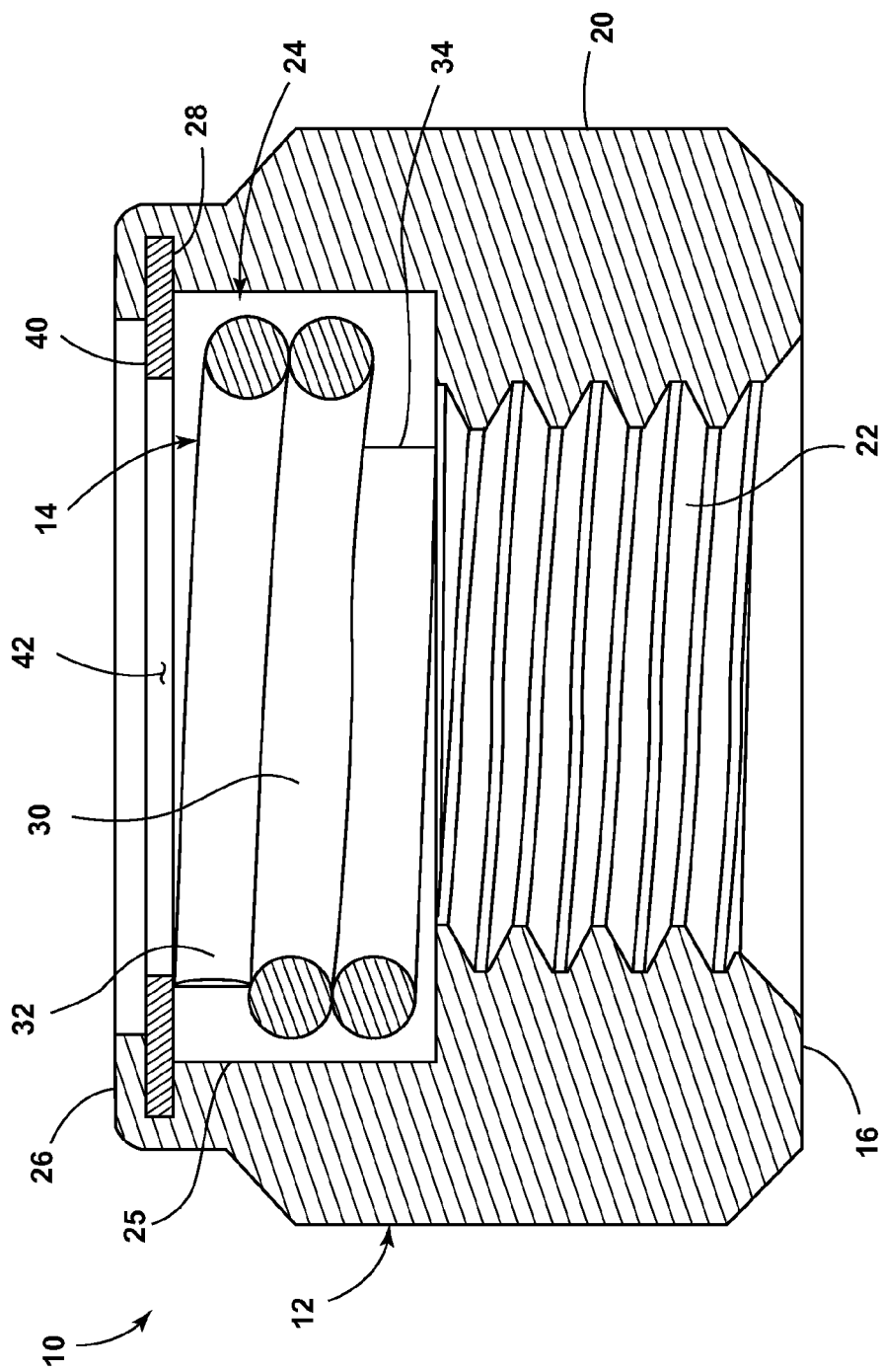
FIG. 2 is a cross-sectional view of the assembled locknut, taken along line II-II in FIG. 1.
Figure 3:
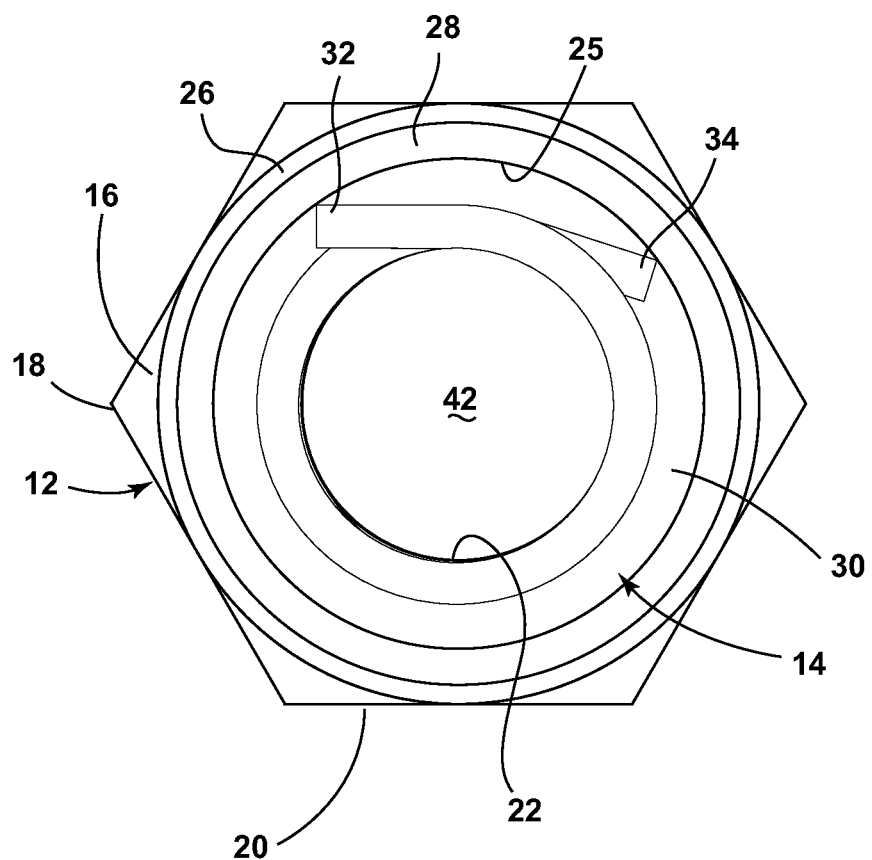
FIG. 3 is a top plan view of the locknut without the retainer and without the shoulder swaged.

A locknut constructed in accordance with a current embodiment of the invention is illustrated in FIGS. 1-3 and generally designated 10. The locknut 10 is a prevailing torque type fastener that creates frictional interference between the locknut and a mating component, so that there is resistance to rotation during both installation and removal.

The locknut 10 includes a nut body 12, a locking element, spring, coil, or band 14, and a retainer 40.

The nut body 12 includes a hex-shaped outer portion 16 configured to be engaged and driven by a conventional driving tool (not shown). The hex-shaped portion 16 includes a plurality of corners 18 and a plurality of flats 20 extending therebetween. Alternatively, the nut body 12 may be square, otherwise polygonal, or any other shape adapted to be engaged by a conventional or special driving tool, now known or later developed.

The nut body 12 includes a threaded portion 22 and an unthreaded portion 24 defining a counterbore, recess, or pocket. The counterbore 24 includes a sidewall 25, a shoulder 26, and a collar 28. The shoulder 26 separates the sidewall 25 and the collar 28. The internal diameter of the sidewall 25 of the counterbore 24 is smaller than the internal diameter of the collar 28. The sidewall 25 is an uninterrupted cylinder.

The locking band 14 includes a coil portion 30 having a circular cross-section, a first tang or end portion 32, and a second tang or end portion 34. The first and second tangs 32, 34 extend tangentially from the coil portion 30. In the current embodiment, the first and second tangs 32, 34 are straight, but other configurations are possible. The ends of the tangs 32, 34 are "sharp", for example as would occur from cutting, or otherwise configured to "bite" into the uninterrupted cylindrical sidewall 25. This configuration is sufficient to prevent each tang 32, 34 from moving in one direction with respect to the nut body 12.

In the current embodiment, the locking band 14 includes one or more turns. Alternatively, the locking band 14 may include less than one turn, in which case the first tang 32 and the second tang 34 may overlap. In the illustrated example, the locking band 14 has two full turns, and the first and second tangs 32, 34 are radially separated.

In the current embodiment, the locking band 14 is fabricated of wire or other stock having a circular cross section. Other cross-sectional shapes are possible, including square, rectangular, ovate, and triangular. The cross-sectional thickness (e.g. diameter), regardless of shape, is equal to or less than the thread pitch of the threaded portion 33. In the current embodiment, the locking band 14 is symmetrical to simplify assembly of the locknut 10.

The retainer 40 is a washer-shaped or ring-shaped member having a central opening 42.

Assembly

To assembly the locknut 10, the locking band 14 is inserted into the unthreaded counterbore 24 of the nut body 12. The tangs 32, 34 must be flexed at least slightly to insert the locking band 14 within the nut body 12. For example, the locking band 14 may be lightly pressed into the counterbore 24. Following insertion, the first and second tangs 32, 34 contact the interior surface of the counterbore 24. The light press fit of the locking band 14 within the counterbore 24 develops or sets the prevailing torque for the locknut 10.

During assembly, the locking band 14 is indexed to the threaded portion 22 of the nut body 12. Consequently, when the locknut 10 is threaded onto the externally threaded member, the threaded member smoothly engages both the threaded portion 22 and the locking band 14.

The locking band 14 is positioned below the shoulder 28. The retainer 40 is positioned against the shoulder 28, over the locking band 14, and encircled by the collar 26. To secure the retainer 40 and the locking band 14 within the nut body 12, and to maintain alignment of the components, the collar 26 of the nut body 12 may be swaged or otherwise deformed over top of the retainer 40. Of course, any suitable means for deforming the collar 26 over the retainer 40 or otherwise securing the retainer in position may be used.

The retainer 40 and the locking band 44 are sized to fit both the desired nut body 12 and the externally threaded member, for example, a standard bolt. The outside diameter of the retainer 40 may be sized to fit within the internal diameter of the collar 26, and the central opening 42 may be sized to match or provide clearance to the externally threaded member. Optionally, the central opening 42 may be sized to provide interference with the minor diameter of the externally threaded member so as to seal off the interior of the nut body 12 from the environment. Further optionally, the retainer may be formed as a cap (i.e. without a central opening 42) to provide an integral protective cover for the locknut 10.

The diameter of the locking band 14 provides sufficient clearance to enable the locking band 14 to slightly elastically expand when the locknut 10 is mounted on the threaded member. The thickness of the wire of the locking band 14 is no greater than the pitch of the threaded portion 22, so that the coils of the locking band 14 can fit within the threads of the externally threaded member. Additionally, the locking band 14 is wound to have the same direction as the threaded portion 22.

The nut body 12, the locking band 14, and the retainer 40 may be manufactured from any suitable materials. As one option, the locking band 14 may be manufactured of relatively low-cost materials such as round steel or spring temper wire.

Operation

Angular movement of the tangs 32, 34 is resisted due to contact of the tangs 32, 34 with the sidewall 25 of the counterbore 24. However, with enough applied torque, the locknut 10 will rotate. For example, during rotation of the locknut 10 in an installation or clockwise direction, the end of the second tang 34 bears against the sidewall 25 of the counterbore 24. Oppositely, during rotation of the locknut 10 in a removal or counterclockwise direction, the end of the first tang 32 bears against the sidewall 25 of the counterbore 24.

To install the locknut 10 onto the externally threaded member, the nut body 12 is rotated in a first or generally clockwise direction. As described above, the externally threaded member causes the coil portion 30 of the locking band 14 to expand elastically by a small amount. Rotating the nut body 12 in the clockwise direction presses the end of the second tang 34 against the sidewall 25 of the counterbore 24, thereby resisting rotation of the locking band 14 while the threaded member is installed. The expansion of the locking band 14 on the threaded member provides substantial frictional grip to resist loosening torque under vibration that may be experienced when in use.

To remove the locknut 10, the nut body 12 is rotated in a second or generally counterclockwise direction. Rotating the nut body 12 in the counterclockwise direction presses the end of the first tang 32 against the surface of the counterbore 24. As with installation, this force resists rotation of the locking band 14.

The locknut 10 described herein provides consistent and substantially equal prevailing torque during both installation and removal. The locknut 10 smoothly engages the threaded member without excessive torque. Further, the amount of prevailing torque can be controlled by adjusting one or more of the initial diameter of the locking band 14, the number of turns in the locking band, the thickness (e.g. diameter) of the locking band wire, and the amount of interference between the tang ends 32, 34 with the counterbore 24. The present locknut 10 is simple to use, can be reused multiple times without loss of effectiveness, may be scaled to meet specific needs, and does not damage the bolt threads. Further, the locknut 10 may be economically manufactured in material suitable for extreme temperature service, provides vibration resistance, will not gall or seize, and provides consistent prevailing torque to improve joint clamp-up consistency.

The above descriptions are current embodiments of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, individual elements of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims.

Directional terms, such as "vertical," "horizontal," "top," "bottom," "upper," "lower," "inner," "inwardly," "outer," "outwardly," "clockwise," and "counterclockwise" are used to assist in describing the invention based on the orientation of the embodiments shown in the drawings. The use of directional terms should not be interpreted to limit the invention to any specific orientation. Any reference to claim elements in the singular, for example, using the articles "a," "an," "the," or "said," is not to be construed as limiting the element to the singular unless expressly stated in the issued claims.

The invention claimed is:

1. A prevailing torque locknut comprising:
a nut body having an internally threaded portion and an unthreaded counterbore having a sidewall comprising an uninterrupted cylinder; and
a locking band within the counterbore, the locking band including a coil portion and first and second tangs extending outwardly beyond the coil portion, the locking band disposed within the counterbore, the first and second tangs engaging the sidewall of the counterbore, whereby the engagement of the first tang with the sidewall prevents relative rotation of the locking band and the nut in a first direction, and further whereby the engagement of the second tang with the sidewall prevents relative rotation of the locking band and the nut in a second opposite direction.

2. The locknut of claim 1 wherein the first and second tangs have ends that are sharp to bite into the uninterrupted cylindrical sidewall to prevent each tang from moving in one direction with respect to the nut body.

3. The locknut of claim 1 wherein the first and second tangs extend tangentially from the coil portion of the locking band.

4. The locknut of claim 1 further comprising a retainer secured within the nut body, the locking band located between the threaded portion and the retainer.

5. The locknut of claim 4 wherein the nut body includes a deformed shoulder securing the retainer within the nut body.

6. The locknut of claim 1 wherein the pitch of the locking band is no greater than the pitch of the threaded portion of the nut body.

7. The locknut of claim 1 wherein the retainer defines a central aperture having a diameter corresponding to the diameter of the threaded portion of the nut body.

8. A prevailing torque locking fastener comprising:
a fastener body having a threaded portion and an unthreaded counterbore having a sidewall comprising an uninterrupted cylinder; and
a locking band including a coil portion and first and second tangs extending from the coil portion, the locking band located within the counterbore, the first and second tangs engaging the counterbore sidewall to prevent relative rotation between the locking band and the fastener body in either direction.

9. The locking fastener of claim 8 wherein the first and second tangs have ends that are sharp to bite into the uninterrupted cylindrical sidewall to prevent each tang from moving in one direction with respect to the fastener body.

10. The locking fastener of claim 8 wherein the first and second tangs extend tangentially from the coil portion.

11. The locking fastener of claim 8 wherein:
the engagement of the first tang with the sidewall prevents the relative rotation in a first direction; and
the engagement of the second tang with the sidewall prevents the relative rotation in a second direction.

12. The locking fastener of claim 8 further comprising a retainer secured within the fastener body to secure the locking band within the fastener body.

13. The locking fastener of claim 12 wherein the fastener body is deformed to secure the retainer within the fastener body.

14. The locking fastener of claim 12 wherein the retainer defines a central aperture having a diameter corresponding to the diameter of the threaded portion of the fastener body.

15. The locknut of claim 8 wherein the pitch of the locking band is no greater than the pitch of the threaded portion of the fastener body.

* * * * *